Aug. 27, 1935. H. G. BEDELL ET AL 2,012,749
APPARATUS FOR THE MANUFACTURE OF FABRICS
Filed Sept. 2, 1933 7 Sheets-Sheet 1

H. G. Bedell
T. P. Eustege
W. J. Brown INVENTORS

By: Marks & Clark Attys.

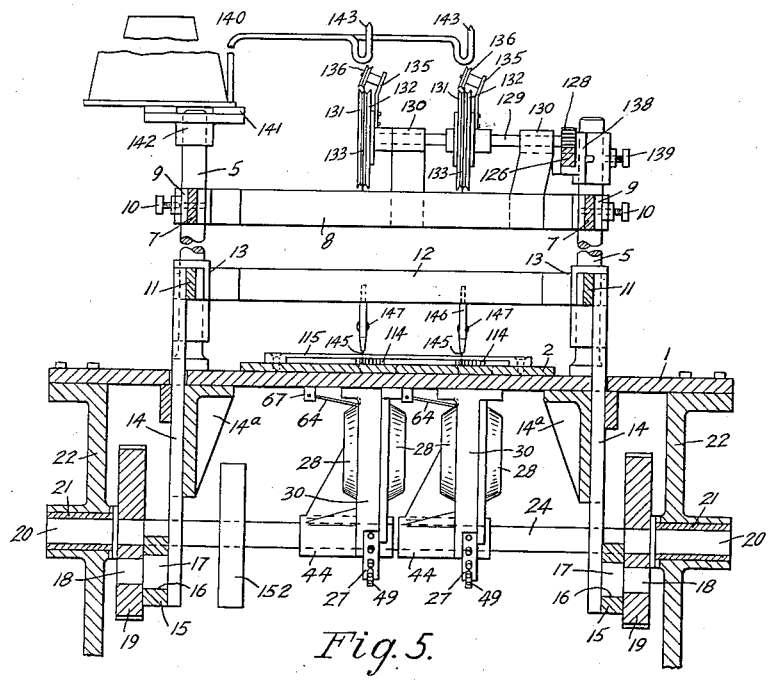

Aug. 27, 1935.  H. G. BEDELL ET AL  2,012,749
APPARATUS FOR THE MANUFACTURE OF FABRICS
Filed Sept. 2, 1933  7 Sheets-Sheet 5
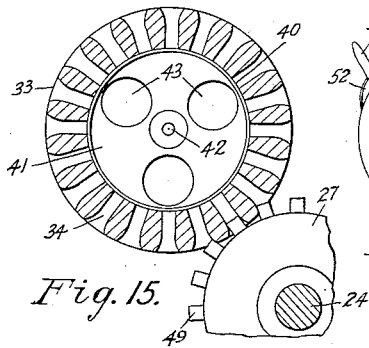
Fig. 15.
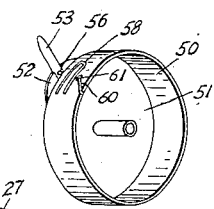
Fig. 16.
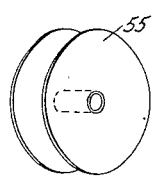
Fig. 17.
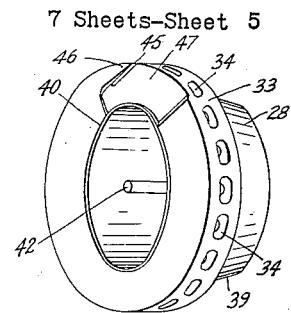
Fig. 18.
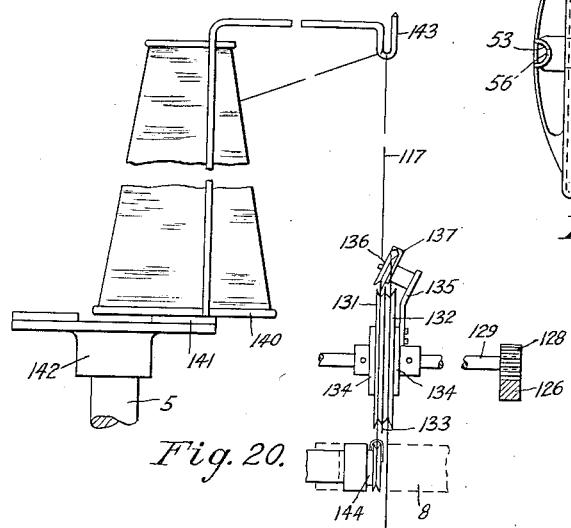
Fig. 20.
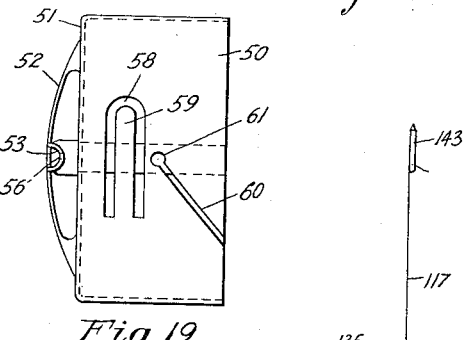
Fig. 19.
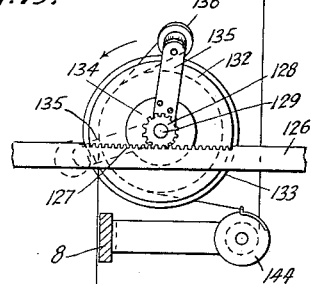
Fig. 21.
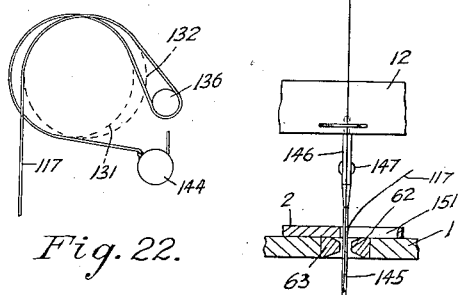
Fig. 22.
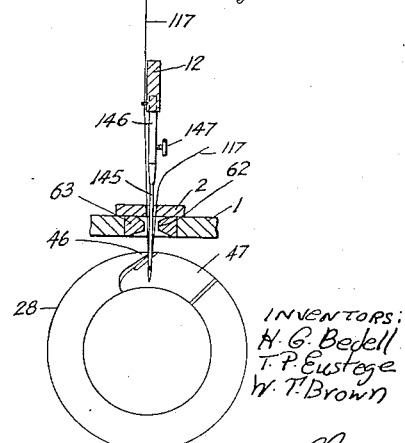
INVENTORS:
H. G. Bedell
T. P. Eustege
W. T. Brown
By Marks & Clerk
Att'ys.

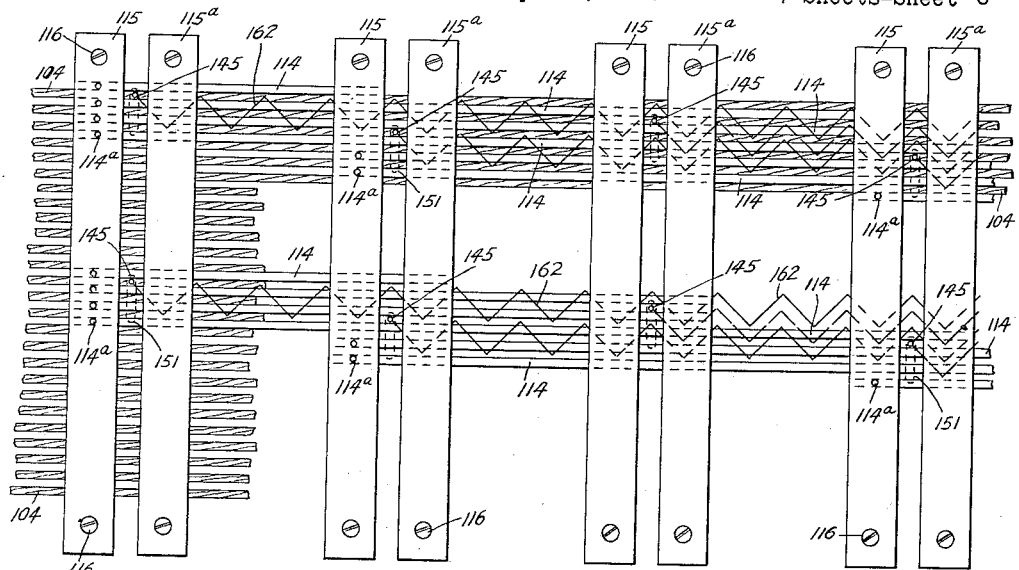
Fig. 23.
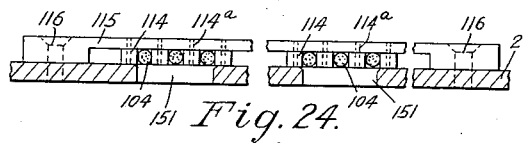
Fig. 24.
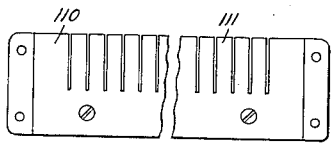
Fig. 26.
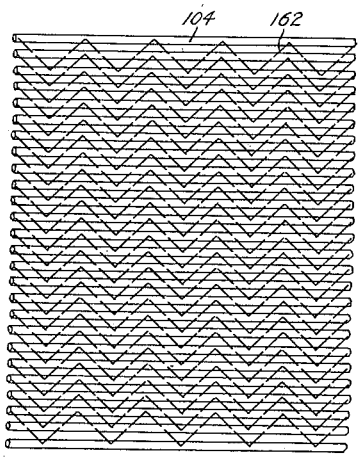
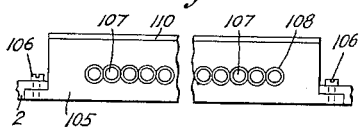
Fig. 27.
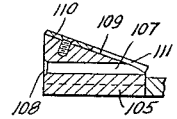
Fig. 28.
Fig. 25.
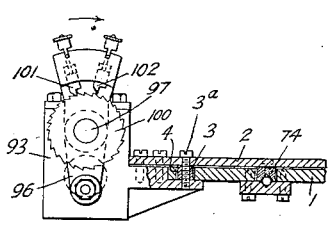
Fig. 30.
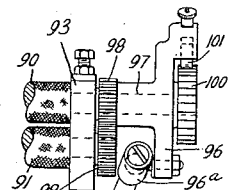
Fig. 31.
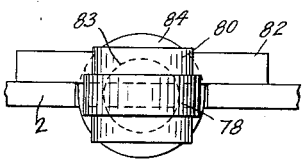
Fig. 32.

Aug. 27, 1935.  H. G. BEDELL ET AL  2,012,749
APPARATUS FOR THE MANUFACTURE OF FABRICS
Filed Sept. 2, 1933    7 Sheets-Sheet 7
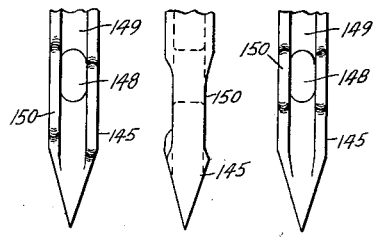
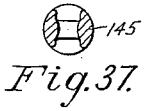
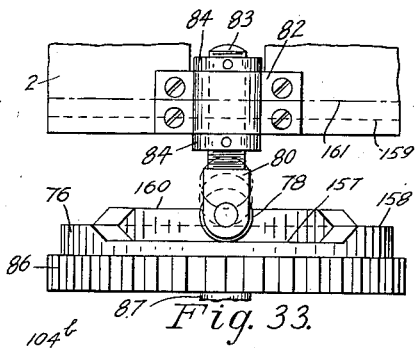
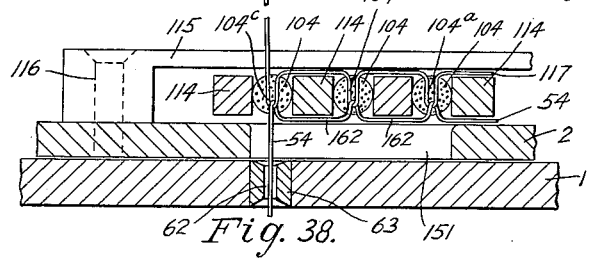
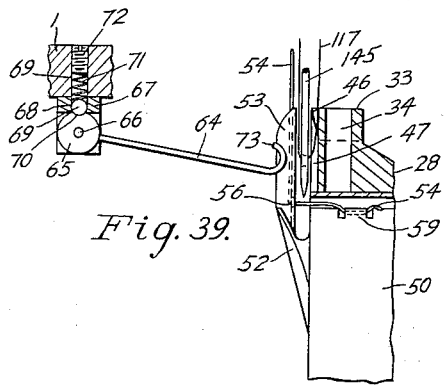
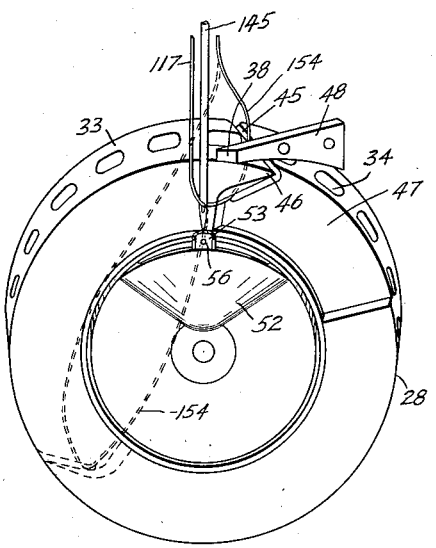
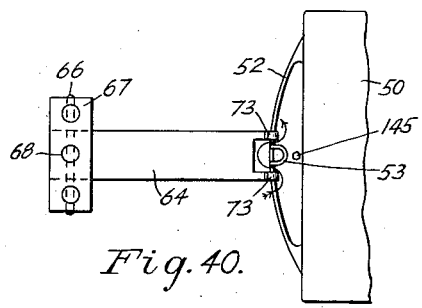
INVENTORS:
H. G. Bedell
T. P. Eustege
W. T. Brown
by Marks & Clerk
Attys.

Patented Aug. 27, 1935

2,012,749

UNITED STATES PATENT OFFICE 2,012,749

APPARATUS FOR THE MANUFACTURE OF FABRICS

Henry George Bedell, Thomas Peter Eustege, and William Thomas Brown, Wellington, New Zealand, assignors to Lockstitch Weavers Limited, Wellington, New Zealand, a registered company of New Zealand Application September 2, 1933, Serial No. 688,022
In New Zealand September 19, 1932

17 Claims. (Cl. 112—2)

This invention relates to methods of and apparatus for the manufacture of fabrics, such as cloth or the like, which is formed of a series of threads wherein one set of parallel threads is stitched together by a second and third series of threads.

According to the present invention, a number of adjacent strands are intermittently led in a forward direction, and reciprocated intermittently in a transverse direction, means being provided whereby the strands are stitched together during the pause in the combined intermittent movement.

In a mode of carrying out the invention, a series of needles are arranged in a movable frame reciprocating so that the needles thereon will pass through the longitudinal strands, the thread from the needle being engaged by the hook of a rotating shuttle, and carried around such shuttle so as to encircle the thread from the bobbin within the shuttle, and, as the needles return, the transverse movement of the strands will cause the next locking stitch to an adjacent strand, thus joining the strands together by lock stitches.

The synchronization between the shuttles and the needles will be obtained by suitable mechanical means, e. g. the needle carrying frame may be reciprocated by means operated from a train of gearing, which also rotates shafts for operating the shuttles. The longitudinal strands are carried upon a movable table adapted to have an intermittent reciprocating lateral movement. The strands on this plate are suitably guided thereon and the needles in the needle carrying frames are staggered and spaced apart so that on the downward movement of the needle, a stitch is obtained through or between the strands passing beneath each needle and on the return of the needle the table moves laterally and the longitudinal strands move forwardly so that the next downward movement of such needle will pass through an adjacent thread, or the thread or threads next to such adjacent thread, as desired. From this position, as soon as the needles return clear of the strands, a further lateral movement of the table will take place, with the consequent forward movement of the strands, and a further stitch made. The plate on its next movement, will return in the other direction and the needles will again pass through an adjacent strand, thus forming a zigzag stitch throughout the length of the material, each row of needles similarly dealing with the intervening threads until all the threads have been joined by this system of stitches.

The invention will be described with the aid of the accompanying drawings, wherein:—

Figure 1 is a part side elevation of the machine taken from the feeding end.
Figure 2 is a plan thereof.
Figure 3 is a longitudinal section of the machine taken from the delivery end along line A—A Figure 4 below, and
Figure 4 is a plan of the machine at the delivery end with the take-up mechanism removed.
Figure 5 is a transverse section of the machine on line B—B, Figure 3.
Figure 6 is a side elevation of the take-up mechanism.
Figure 7 is a cross section of the same.
Figure 8 is a similar view to Figure 6 showing the cam in another position.
Figure 9 is an elevation of a shuttle unit.
Figure 10 is a plan thereof.
Figure 11 is a cross section of a shuttle on line C—C Figure 9.
Figure 12 is a cross section of part of a shuttle drawn to a larger scale than the preceding views.
Figure 13 is a reverse elevation of the shuttle unit.
Figure 14 is an end elevation thereof.
Figure 15 is a sectional elevation of a shuttle and its driving wheel.
Figure 16 is a perspective view of a bobbin housing.
Figure 17 is a perspective view of a bobbin.
Figure 18 is a perspective view of a shuttle.
Figure 19 is a plan of the bobbin housing.
Figure 20 is a front elevation showing how the thread leads from a spool to the needle.
Figure 21 is a side elevation of the mechanism shown in Figure 20.
Figure 22 is a diagram showing the position of the thread on the take-up pulleys.
Figure 23 is a part plan of the guide ribs on the movable table.
Figure 24 is a front elevation of the ribs shown in Figure 23.
Figure 25 is a view of the material with stitching complete.
Figure 26 is a plan of the tension feed plate.
Figure 27 is a front view thereof.
Figure 28 is a cross section.
Figure 29 is a detail of the tooth of the tension feed plate.
Figure 30 is an end elevation of the feed rollers mechanism, and
Figure 31 is a front elevation thereof.

Figure 32 is an elevation of the movable table rollers and bracket.

Figure 33 is a part plan showing the cam mechanism for operating the movable table.

Figure 34 is a front elevation of a needle.

Figure 35 is a side elevation.

Figure 36 is a reverse view to Figure 34.

Figure 37 is a sectional plan of the needle.

Figure 38 is an enlarged section showing how the strands are stitched together.

Figure 39 is an elevation partly in section of the bobbin housing finger.

Figure 40 is a plan thereof.

Figure 41 is a perspective view of a shuttle and the loop forming thereon.

Figure 3:
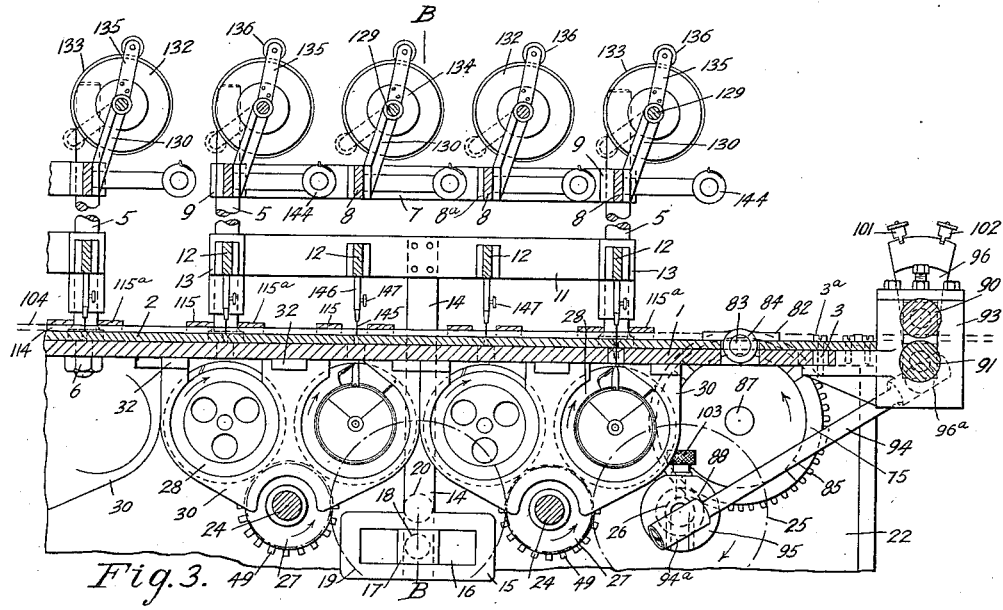

Referring to the drawings, the machine consists of a bed-plate 1, having a laterally movable table 2 guided by distance pieces 3 fixed by screws 3a to the underside of the table slideable in vertical slots 4 (see Figures 4 and 30) in the delivery end of the bed-plate 1. Vertical stanchions 5 are secured in the bed-plate 1 by nuts 6 and are braced by horizontal frames consisting of longitudinal bars 7 and transverse bars 8 the center bars being fixed by lugs 8a to the longitudinal bars and the end bars fixed in lugs 9 which are fixed to the stanchions by set screws 10, while needle carrying frames, consisting of longitudinal bars 11 and a number of transverse bars 12 and formed in the manner of the fixed frame, but in this case the corner lugs 13 (see Figure 4) are vertically slideable on the stanchions 5. Each needle carrying frame is reciprocated vertically by means of a rod 14 on each side of the machine being slideable in guides 14a (see Figure 5) and fixed at its lower end to a yoke 15 in the slot 16 of which a block 17 slides, being pivoted on a pin 18 projecting from a gear wheel 19 mounted on a spindle 20 mounted in bearings 21 in the side frames 22 supporting the bed-plate 1 (see Figures 3 and 5). This gear wheel 19 is driven from a train of gears consisting of pinions 23 on transverse shafts 24 and other gears 25 on spindles 26 arranged below the table and journalled in the side frames 22. Upon the shafts 24 are located gears 27 for driving the shuttles 28, which are disposed above and on each side of the gear 27 so that a pair of shuttles is driven from each gear 27 (see Figure 3 and Figures 9 to 14). Two sets are shown driven from each shaft 24 (see Figure 5).

The shuttles 28 are rotatable in shuttle races 29 formed in shuttle frames 30 having a bearing 44 through which the shafts 24 pass and are secured to the under side of the bed-plate 1 by screws 31 passing through lugs 32 integral with the frame 30. Holes 31a in the table 2 enable the screws to be removed without detaching such table. Each shuttle 28 is in the form of an annular member having its peripheral face 33 provided with gear openings 34 therein and from this annular member projects a lateral wall 39 conical upon its exterior (see Figures 11, 12, and 18). Within this annular wall 39 is fixed a cylindrical casing 40 having an end wall 41 which has a pin 42 projecting into the center of the shuttle and which also has holes 43 (see Figures 9 and 11) to aid in pushing out the bobbin housing 50.

A diagonally shaped slot 45 (see Figures 10, 18, and 41) is formed between two of the gear holes 34, and this slot enters tangentially into the face 33 and forms a hook 46 for engaging the thread from the needle and carrying it around the shuttle. On the flat surface of the annular member of the shuttle 28, and extending a required distance, is a slightly recessed part 47, provided in order to allow the necessary loop in the thread to form, as will hereinafter be explained. Immediately above the wall of the shuttle, a plate 48 (see Figures 9, 10, and 41) is attached to form a spreader, extending to a point near the travel of the needle and is fixed to the shuttle frame 30 by screws 37 and a bevelled face 38 in line with the point of the hook 46. This spreader aids in guiding the thread into and along the shuttle slot 45.

The gears 27 consist of a disc from the circumferential periphery of which project cylindrical pins 49. These pins register with the holes 34 in the circumferential periphery 33 of the shuttle, such holes being generated so as to give contact at any point of engagement with the pin teeth 49 as shown in Figure 15, the edges of the holes 34 in a circumferential direction being curved outwards for this purpose.

Figure 12:
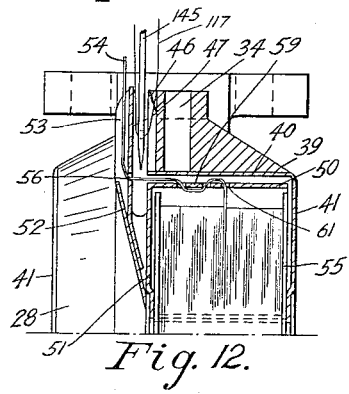
Figure 13:
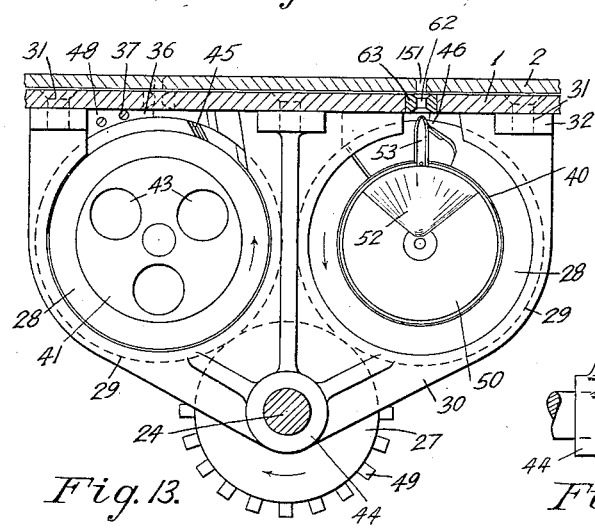
Figure 14:
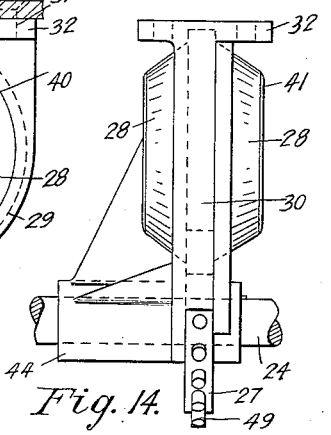

A bobbin housing 50 (see particularly Figures 16 and 19) consists of the usual cylindrical casing having a closed end 51 which has a segmental shaped hood 52 from which projects a guide finger 53, the thread 54 (see Figure 12) from the bobbin 55 passing through a hole 56 in the guide finger 53 which is U shaped in section (see Figures 12, 19, and 40) the thread lying in the channel thereof which shields the thread and prevents its fouling the hook 46 of the shuttle. In the cylindrical wall of the bobbin housing 50, a U shaped slot 58 (see Figures 16 and 19) is provided leaving a central tongue 59 which acts as a tension spring for the thread 54. A diagonal slot 60 terminates in a hole 61 placed near the center of the cylindrical wall through which is led the thread 54 from the bobbin 55 within the casing. From this hole 61 the thread 54 passes under the tongue 59, (as shown in Figure 12) through the hole 56 of finger 53 and upward through an opening 62 in a bushing 63 in the bed plate 1 (see Figure 38).

The bobbin housing 50 is retained in an upright position by means of the finger 53 partially entering a clip 64 (see Figures 5, 39, and 40) pivoted by its boss 65 on a pin 66 in the forks of a bracket 67 fixed to the underside of the bed plate by screws. A central hole 68 corresponds with a hole 69 in the bed plate 1. In the hole 68 is located a ball 69 in a recess 70 bearing on the surface of the boss 65. Located in the hole 69 is a tension spring 71 retained by a stub screw 72 in the bed plate 1. The end of the finger 64 is turned up to form forked hooks 73 to engage the finger 53. The use of the ball and spring is to enable the clip to be held sensitively in its correct position and easily pushed down to remove the housing 50 and when pushed upwards assumes its correct position.

Figure 2:
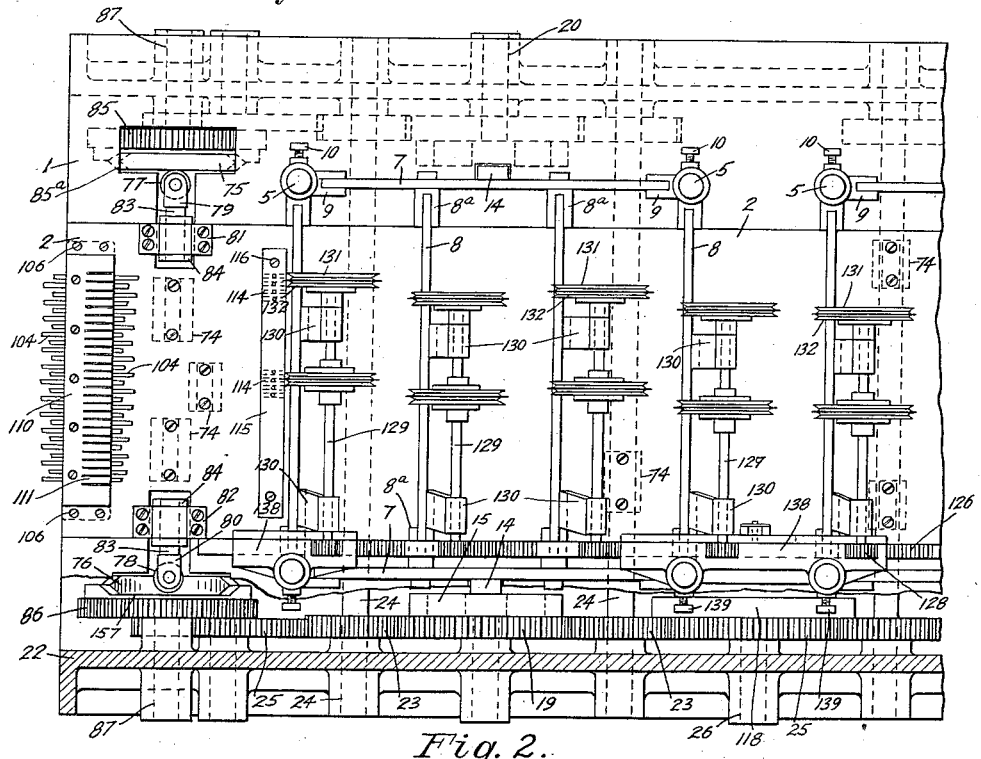
Figure 4:
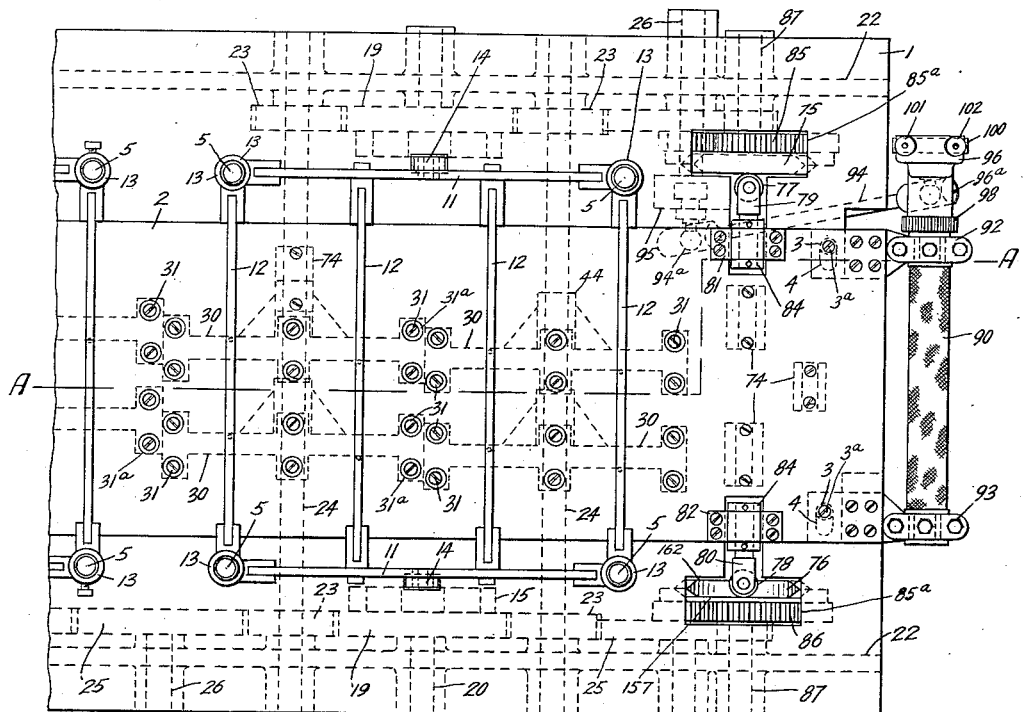
Figure 9:
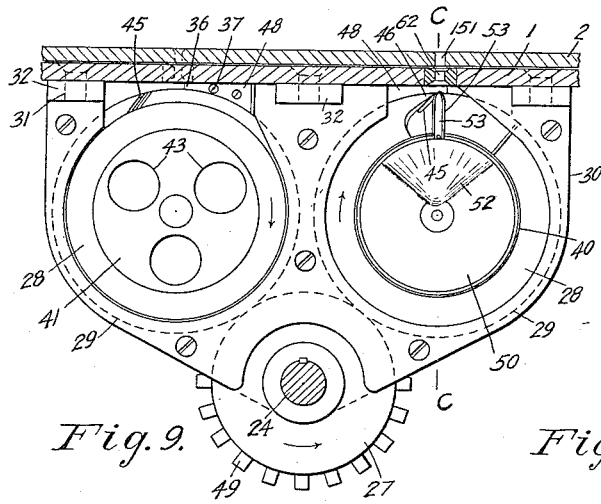
Figure 11:
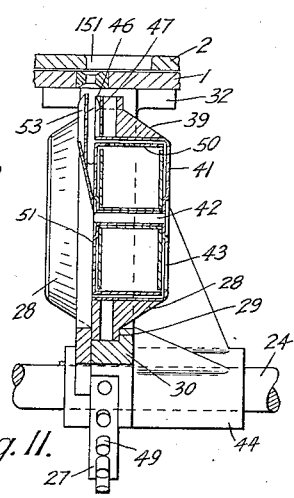
Figure 10:
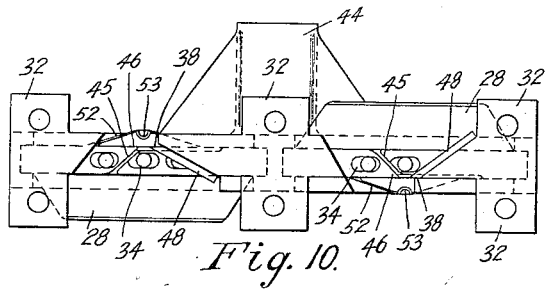

The movable table 2 in order to move easily is mounted upon ball races 74 distributed at intervals beneath the table, and located in the bed plate 1 (see Figure 30 and also dotted lines Figures 2 and 4).

Figure 1:
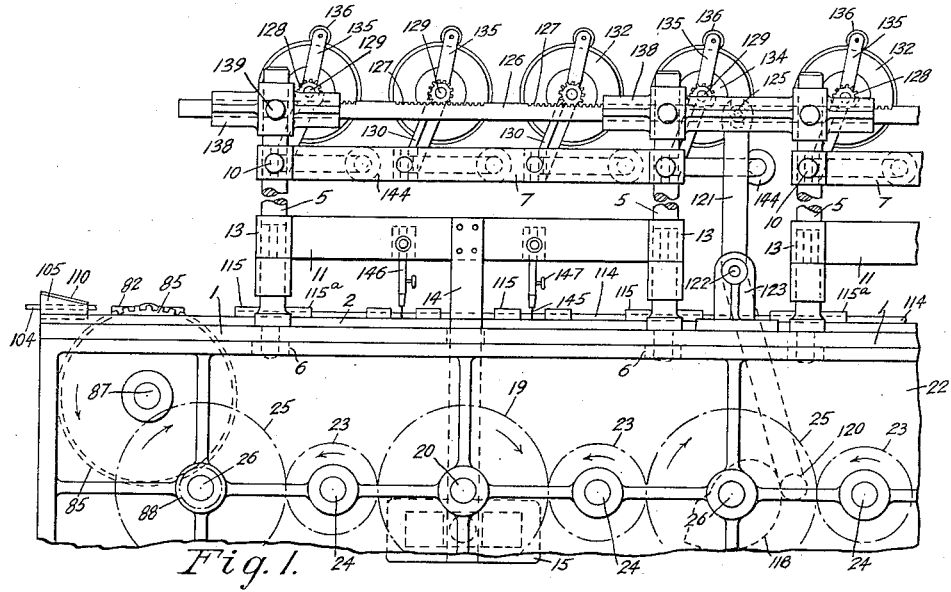

The table 2 is reciprocated by means of discs 75 and 76 at both ends of the machine having cam surfaces (Figures 2, 4, and 33) stepped in order to give the table 2 the necessary intermittent lateral motions in one direction and to be returned in a similar manner. The discs project above the surface of the bed plate 1 through opening 85a, the cam faces contact with rollers 77 and 78 mounted in forks 79 and 80 secured in brackets 81 and 82 on the table 2, (see also Figure 32). Pins 83 integral with the forks pass through the bracket and are adjustable by collars 84 threaded on the pin 83 on each side of the bracket as shown in Figure 33. The cams 75 and 76 are rotated by being fixed respectively to spur wheels 85 and 86 journalled by means of their spindles 87 in bearings in the frame 22. The spur wheels are rotated by pinions 88 (see Figure 1) fixed on one of the spindles 26.

A pair of serrated rollers 90 and 91 (see Figures 3, 4, 30, and 31,) movable with the table 2, are pivoted in brackets 92 and 93 fixed to the delivery end of the table 2. These rollers are serrated or roughened so as to grip the fabric. They are rotated intermittently by means of a lever 94 pivoted at one end by means of a universal ball joint 94ª of ordinary construction to an eccentric head 95 fixed on the same spindle 26 as the pinion 88 see more particularly Figure 3 and in dotted lines Figure 4. The lever 94 at its other end is pivoted by a universal ball joint 96ª to a rocking arm 96 mounted loosely on the spindle 97 of the roller 90. Pinions 98 and 99 are respectively fixed on the spindles of the rollers 90 and 91 meshing with each other, while on the end of spindle 97 a ratchet wheel 100 is fixed. Spring operated pawls 101 and 102 are adjustable in the rocking arm 96. One of these pawls would be in engagement with the ratchet wheel 100, the other being set half a tooth in advance or behind the other (see Figure 30) in order that one or other may be used to engage the ratchet wheel 100 so that fine adjustment can be obtained for feeding of the fabric. The eccentric 95 is adjustable in any suitable well known manner by a screw 103.

As the head 95 rotates it will impart a reciprocating movement to the lever 94 which rocks the arm 96 which during its movement in the direction of the arrow in Figure 30 rotates the roller 90, which imparts its motion to the roller 91 by means of the pinions 98 and 99.

The longitudinal strands 104 are guided through a tension comb consisting of a base 105 fixed to the movable table 2 at the feed end thereof by screws 106. The base has a number of holes 107 according to the number of strands to be used. The front of the holes are countersunk or rounded, as shown in Figures 27 and 28 at 108, to ensure easy threading of the strands. The top of the base has an inclined face 109 upon which lies and is fixed a tension plate 110 having comb teeth 111 to register with the holes 107 through the base, and bear on the strands as they pass through the comb. The tips of the teeth 111 are concave, as at 112 (Figure 29), on their under side to fit partly around the strands.

On the table 2 is a series of guides consisting of parallel ribs 114 (see Figures 1, 2 and 23, 24) fixed at one end by rivets 114ª to transverse bars 115 fixed to the table by screws 116. For clearness these ribs are not shown in Figures 3 and 4, and only the position they commence from in Figure 2. The ribs 114 extend longitudinally on the table on each side of the needles, but only sufficiently far to act as guides to the strands whilst being stitched. These ribs, it will be seen, are fixed at their ends nearest the feed end of the machine, so that at the commencement four ribs 114 are associated with a needle (see Figure 23), so that at each stop position of the lateral movement of the table the needle will pass down between two of the ribs, three of which extend to the next two rows of needles and one of these three ribs extending to a fourth row of needles. The transverse plates 115ª may be used to aid in retaining the ribs in position. Where a further rib is introduced, it is held to a cross plate 115 in the same way, further ribs being introduced as required throughout the length of the machine. The thread 117 from the needle 145 and the thread 54 from the bobbin as the table moves laterally is looped over a rib (as shown in Figure 38), and the loop so formed slides over the rib until the end is reached.

The needles are indicated at 145, the needles of the second row being two strands from the needles of the first row, and the needles of the third row passing through the intervening strand, the needles of the fourth row taking a strand to the side of the previously stitched strand, and so on.

A cam disc 118 (see Figures 1 and 6 to 8) is fixed on one of the spindles 26, and has formed in it a cam groove 119, the sides of which form faces against which a roller 120 pivoted on the lower end of a rocking arm 121 works. The rocking arm is pivoted at 122 in a bracket 123 fixed on the bed-plate 1. The upper end of the arm is bifurcated to receive a roller 124 mounted on a pin 125 fixed to a rack 126 having sections of teeth 127 at intervals to engage pinions 128 fixed on transverse spindles 129 (see also Figure 5) mounted in brackets 130 fixed to the transverse bars 8 of the fixed frame.

On the spindles 129 are loosely mounted grooved takeup pulleys 131 and 132 (see particularly Figures 20 and 21), separated from each other by a thin plate 133, also loosely mounted on the spindles 129. Bosses 134 fixed on the spindles retain the pulleys in position. An arm 135 is fixed to one of the bosses 134, and has its outer end bent over at an angle and carries a small take-up guide pulley 136 pivoted thereto. The pulley 136 being disposed at an angle, as shown in Figure 20, enables the groove at the back of this pulley 136 to be in alignment with the groove in the pulley 131, and the groove in the front of the pulley 136 to be in alignment with the groove in the pulley 132. A keeper 137 fixed to the arm 135 concentric with the pulley extends a portion of the way around the pulley in order to retain the thread 117 thereon. The guide pulleys 136 have been omitted from Figure 2 for the sake of clearness.

The racks 126 are slidable in brackets 138 fixed on the stanchions 5 by set pins 139. In Figure 2, it will be seen that a short bracket is only required at the feed end of the machine.

The thread 117 to the needles leads from spools 140, these being provided one for each needle, arranged in a suitable position relative to the needles. One spool is shown mounted on a spool carrying plate 141 (see Figures 5 and 20) fixed to the stanchions 5 by heads 142, the remanider being arranged in a similar manner, or where required, and the thread 117 leads over a hook 143, fixed at its lower end on the plate 141, and then passes downwards around a tension 144 of usual construction fixed on a transverse bar 8 of the fixed frame. The thread then passes, as in Figures 20 and 21, first under the take-up pulley 131 in the groove thereof, and then under the guide pulley 136, over such pulley, and down into the groove of the take-up pulley 132, and thence to the needle 145. This needle is held in a needle holder 146 by a clamping screw 147, the holder 146 being fixed in a transverse bar 12. The needle is illustrated in Figures 34 to 37 and has the usual eye 148 with the usual channels 149 on each side of the needle. The edges of the channel, for a certain distance above and below the eye, are cut away as at 150, and all the edges rounded to avoid any sharp edges which would tend to break the thread. This is necessary in this machine on account of the varying angles the thread takes in the course of stitching.

The table 2 has slots 151 (see Figures 23, 24, and 38) for the needles to pass through, and is of sufficient length to permit of the lateral movement of the table.

One of the spindles 24 near the center of the machine is selected to receive a driving pulley 152 (see Figure 5) driven from any convenient source of power.

The longitudinal strands 104 lead from spools suitably placed (not shown) and are threaded through the holes 107 in the tension comb and led between the guide ribs 114, under the transverse plates 115 and 115ª, and so on throughout the length of the machine, the ends being gripped by the feed rollers 90 and 91. The bobbin 55 is filled, and the thread therefrom threaded through the shuttle housing, as previously described through the finger 53, up through the hole 62 and slot 151 of the table 2, and the needle threaded from the spool 140 with the thread 117 as previously described. When the machine is set in motion, the train of gears commences to rotate and the needle carrying frame commences to reciprocate vertically by means of the yoke 15. The driving spindle 24 will be rotated and also the other spindles 24 by the train of gears, and the shuttle will be rotated by the gears 27 on the spindles 24.

Upon the needles assuming the position shown in Figures 12, 20, 21, and 39 the hook 46 on the shuttle is just entering between the needle and the thread, the thread at this stage lying in the recessed part 47, as shown in Figure 12, thus enabling the point of the hook to pass between it and the needle, the arm 135 and its operating mechanism being then in the position shown in Figure 6.

As the hook moves forward by reason of the rotation of the shuttle, the thread is drawn forward and forms a loop 154 (see Figure 41). When this position in Figure 41 has been reached, the arm 135 has been moved to the position shown in dotted lines in Figure 6 by reason of the rotation of the cam. This movement has permitted a supply of thread from the pulley 131 by the guide pulley moving from the position in full lines to the position in dotted lines in Figure 6.

Upon still further rotation of the shuttle, the hook reaches the further position shown in dotted lines in Figure 41; the loop 154 has been enlarged to its fullest extent, and at this stage the loop is passing over the shield 52 and is passing between the forks 73 of the clip 64 and around the finger 53, its passage being indicated by the arrow in Figure 40.

To form this enlarged loop, the cam 118 has moved to the position shown in Figure 8, thereby moving the arm 135 by means of the rack to the position shown in dotted lines in Figure 21, and in full lines in Figure 8. Further rotation of the shuttle releases the thread from the hook 46 and this thread is drawn up by the lever 135 carrying the guide pulley and the thread back to the position shown in dotted lines in Figure 8, and to the position shown in the diagram in Figure 22. When it is so carried back, the lockstitch illustrated in Figure 38 is formed, and the thread held in reserve on the pulleys 131 and 132 for the next loop which will commence to be formed after the shuttle completes another revolution.

During the period that the slack of the loop 154 is taken up by the movement of the arm from the position shown in full lines in Figure 8 to the position shown in dotted lines therein, the needle will return to its uppermost position by the operation of the yoke 15.

When the arm 135 and guide roller 136 during its rearward movement reaches the position indicated by the radial dotted line 156 in Figure 8, it will take up all the slack of the loop and complete the lockstitch; the remainder of the movement to the position in dotted lines will draw a further supply of thread from the spool 140 sufficient for the next lockstitch. This last movement has been brought about by the point of the cam 118 moving to the position shown in dotted lines in Figure 8.

The table, at the position shown in Figure 2, is in one lateral position. At this stage, a flat surface 157 of the cams is against the rollers (see Figure 33) where cam 76 is shown. While the roller 78 is on this surface, no movement of the table would take place. During this stationary position of the table, the loop is carried around the shuttle, and as this action is completed, the lock 104a is formed through a strand 104, as in Figure 38. After this lock is completed and the needle is in a position clear of the table, the face 158 of the cam contacts with the roller 78, moving the table to its mid-position, indicated by dotted lines 159 in Figure 33, where it will remain stationary while the needle passes downward through the strand adjacent the one previously stitched, and forms the lock 104b (see Figure 38) thereby completing the first stitch 162. As the needles are again clear of the table, the next stepped face 160 of the cam will cause the table to travel laterally another step to the position shown in broken lines 161 in Figure 33, and the needles pass through the next strand, forming the lock 104c, thereby completing the two stitches 162 in one lateral direction. While the table is moving laterally and the needles are clear of the table, the feed rollers 90 and 91 are caused to rotate by means of the eccentric head 95 and the gear wheel 86 engaging with the train of gears, this rod operating the rocking arm to enable one of the pawls 101 or 102 to carry round the rollers 90 and 91 and feed the strands the required distance for the next stitch. This forward movement of the strands causes each lock stitch to be slightly ahead of the stitch in the adjacent strand, and after two of such stitches have been made, the table will be moved the reverse lateral direction by the cam 75 which operates the table in the manner as described in regard to cam 76.

The strands are guided and spaced between the ribs 114, and it will be seen in Figure 38 that the stitches above described envelope the ribs 114 and remain around the ribs until the strands have moved forward sufficiently that the stitches reach and pass off the free ends of the ribs. Upon the lateral and forward movements of the strands, the stitches 162 will be formed in a diagonal direction, as shown in Figures 23 and 25. In Figure 23, the strands 104 have been shown in position with one series of ribs, but for the sake of clearness they are not continued through the other series of ribs. By the time the strands which have been stitched at the first row of needles reach the last row of needles, all the stitching will have been completed throughout the length of the portion of the strands originally located between the first and last row of needles, and resulting in a fabric as shown in Figure 25. This fabric may be subjected to any of the usual milling processes.

What we claim is:—

1. Apparatus for the manufacture of fabrics, comprising a frame, a series of shuttles rotating beneath said frame and carrying bobbins for an interlocking thread, vertically movable frames carrying rows of needles, the needles of each row being staggered in relation to the needles in the other rows, means for operating said movable frames, a horizontally movable table over which a series of parallel strands is led, and means whereby said movable table is given intermittent reciprocating lateral movement whereby the strands as they are moved along the table are laterally stitched together in progression, means whereby upon the downward movement of the needles a stitch is commenced at each needle through the strands and when completed the strands are moved laterally in relation to the needles by the movable table and at the same time drawn forward a predetermined distance so that the next downward movement of each needle will pass through an adjacent strand at a distance from the first stitch with further lateral movements of the movable table if desired, after which the table returns in a similar manner with corresponding forward movements of the strands so that a zigzag stitch is provided throughout the length of the material binding the strands together into a complete fabric.

2. Apparatus for the manufacture of fabrics, comprising a frame, a bed-plate supported by said frame, a series of rotary shuttles arranged beneath the bed-plate, bobbins within said shuttles having a locking thread leading therefrom, means for rotating said shuttles, a needle carrying frame adapted to have vertical sliding movement arranged above said bed-plate, means for reciprocating said needle carrying frame in a vertical direction, a number of needles carried by said needle carrying frame, said needles being arranged in transverse rows, the needles in one row being staggered in relation to the needles in the next row, means for leading the thread to said needles, a table movable above said bed-plate adapted to be given intermittent lateral motion in alignment with the rows of needles, longitudinal strands carried by said table, and means whereby said strands are caused to move forward in the intervals of each stitch, and means whereby the strands are guided on the said moving table.

3. In the machine as claimed in claim 2, a number of ribs on said movable table, said ribs spaced apart and forming guides for the strands and extending from a position on each side of said needles so that the stitch may be formed from one strand to the other and over said ribs and as the strands move forward the stitch so formed and encircling a rib will be carried clear thereof.

4. In the machine as claimed in claim 2, a number of ribs on said movable table, said ribs spaced apart and forming guides for the strands and extending from a position on each side of the needles so that the stitch may be formed from one strand to the other and encircling a rib and will be carried clear thereof, said ribs secured to said movable table at one end at the front of the needles, the remaining portion of the ribs being free so that the stitch formed around them may be carried clear thereof.

5. In the apparatus as claimed in claim 2, a cam disc operated by the gearing of the machine and having projecting faces for operating the table laterally, rollers pivoted in brackets fixed to the edges of the said movable table contacting with the faces of said cam disc.

6. In the device as claimed in claim 2, serrated rollers to give the strands intermittent forward movement, brackets on the movable table in which the said rollers are mounted, a lever, an eccentric head fixed upon a transverse spindle of the machine to which head the lever is pivoted, a rocking arm mounted loosely on one of the rollers to which arm said lever is also pivoted, a spring operated pawl adjustable in the rocking arm, and a ratchet wheel upon a spindle of one of the rollers engaged by said pawl.

7. In the machine as claimed in claim 2, vertical stanchions fixed to the bed-plate of the machine, the needle carrying frame slidable on said stanchions, a yoke fixed to the frame, a block sliding in the slot of said yoke, a pin on which said block is pivoted projecting from a gear wheel mounted on a spindle in the frame of the machine and driven from the gearing of the machine.

8. Apparatus for the manufacture of fabrics comprising a frame, a series of shuttles rotating beneath said frame and carrying bobbins for an interlocking thread, a number of needles carried on movable frames, means for operating said needles, a movable table over which a series of parallel strands is led, and means whereby said movable table is given intermittent reciprocating lateral movement whereby the strands as they are moved along the table are laterally stitched together, means for supplying and taking up the thread to form the loop which passes round the rotary shuttle, consisting of a spindle, grooved take-up pulleys mounted loosely on said spindle, an arm on said spindle, a take-up guide pulley pivoted to said arm and arranged above the said take-up pulleys at an angle so that the back of the groove in the guide pulley is in alignment with one of the loose pulleys and the front of the groove in the guide pulley in alignment with the groove in the other loose pulley so that the thread for the needle leads from its supply under one loose pulley over the guide pulley and thence over the other loose pulley.

9. In the apparatus claimed in claim 8, frames above the needle carrying frame, racks guided in said frames, a rocking arm pivoted to the frame of the machine, a cam rotatable from the gearing of the machine, operating the lower end of said arm, the upper end of said arm pivoted to said racks, a pinion on said spindle in gear with the racks so that on operation of the rack said guide pulley will be moved to allow sufficient thread to be released from the loose pulley to form the loop around the shuttle, and afterwards take up the spare thread and form the lock stitch.

10. In the machine as claimed in claim 2, the shuttles in the form of an annular member, a hook formed on said annular member, a lateral wall projecting from one side of the annular member and conical upon its exterior, said members arranged in correspondingly shaped shuttle races in brackets beneath the machine.

11. In the machine as claimed in claim 2, the shuttles in the form of an annular member, a hook formed on said annular member, a lateral wall projecting from one side of the annular member and conical upon its exterior, said members arranged in correspondingly shaped shuttle races in brackets beneath the machine, a driving disc, pin teeth projecting from a circumferential edge of said driving disc, gear openings in the peripheral face of the annular member consisting of holes generated so as to give contact at any point of engagement with the pin teeth projecting from the circumferential edge of the driving disc, the edge of the holes in a circumferential direction being curved outwards for this purpose.

12. In the machine as claimed in claim 2, the shuttles in the form of an annular member, a hook formed on said annular member, a lateral wall projecting from one side of the annular member and conical upon its exterior, said members arranged in correspondingly shaped shuttle races in brackets beneath the machine, the annular wall having a recess in which the thread from the needle lies to enable the hook on the shuttle to enter between such thread and the needle.

13. In the machine as claimed in claim 2, the shuttles in the form of an annular member, a hook formed on said annular member, a lateral wall projecting from one side of the annular member and conical upon its exterior, said members arranged in correspondingly shaped shuttle races in brackets beneath the machine, a recess in the face of the annular wall in which the thread from the needle lies to enable the hook on the shuttle to enter between such thread and the needle, a spreader having a bevelled face projecting over the recess to engage the thread and enlarge the loop.

14. In the machine as claimed in claim 2, the shuttles in the form of an annular member, a hook formed on said annular member, a lateral wall projecting from one side of the annular member and conical upon its exterior, said members arranged in correspondingly shaped shuttle races in brackets beneath the machine, a bobbin housing within the annular member, a guide finger projecting from said housing, a hood around said finger, the finger having a hole therein through which the thread from the bobbin is guided.

15. In the device as claimed in claim 2, a bobbin housing within said shuttle, a finger projecting from said housing, a clip pivoted to the underside of the bed-plate having forked ends to engage the finger and retain the bobbin housing in position, and means to render said clip sensitive.

16. In the device as claimed in claim 2, a tension comb consisting of a base fixed to the movable table and having a number of holes through which the strands pass, the top of the base having an inclined face, a tension plate lying on said inclined face, teeth on the said tension plate curved at their front ends to fit partly around the strands.

17. In the machine as claimed in claim 2, the needles having channels on each side of the eye, the edges of the channels above and below the eye being cut away to avoid any sharp edges.

HENRY GEORGE BEDELL.
THOMAS PETER EUSTEGE.
WILLIAM THOMAS BROWN.